United States Patent
Matsuzaki et al.

(10) Patent No.: US 7,569,958 B2
(45) Date of Patent: Aug. 4, 2009

(54) AXIAL AIR-GAP ELECTRONIC MOTOR

(75) Inventors: Hirokazu Matsuzaki, Kawasaki (JP); Toshiaki Tanno, Kawasaki (JP); Ken Maeyama, Kawasaki (JP); Tomonori Kojima, Kawasaki (JP)

(73) Assignee: Fujitsu General Limited, Kawasaki-Shi, Kanagawa-Ken (JP)

( * ) Notice: Subject to any disclaimer, the term of this patent is extended or adjusted under 35 U.S.C. 154(b) by 0 days.

(21) Appl. No.: 11/979,756

(22) Filed: Nov. 8, 2007

(65) Prior Publication Data

US 2008/0106161 A1 May 8, 2008

(30) Foreign Application Priority Data

Nov. 8, 2006 (JP) .............................. 2006-302373

(51) Int. Cl.
*H02K 11/00* (2006.01)

(52) U.S. Cl. .......................................... 310/71; 310/43

(58) Field of Classification Search .................. 310/71, 310/215, 216, 43

See application file for complete search history.

(56) References Cited

U.S. PATENT DOCUMENTS

| | | | | |
|---|---|---|---|---|
| 6,809,453 | B2 * | 10/2004 | Narita et al. | 310/216 |
| 6,941,638 | B2 * | 9/2005 | Hartsfield et al. | 29/596 |
| 7,116,023 | B2 * | 10/2006 | Wang et al. | 310/71 |
| 2007/0001534 | A1 * | 1/2007 | Kojima et al. | 310/156.37 |

\* cited by examiner

*Primary Examiner*—Nguyen N Hanh
(74) *Attorney, Agent, or Firm*—Manabu Kanesaka

(57) ABSTRACT

In an axial air-gap electronic motor having a stator that is formed by annularly connecting a plurality of core members around an axis of a rotor output axis, an insulator that insulates a winding portion of a stator core of each core member is formed in the winding portion in the shape of a bobbin having a pair of flanges, a winding draw-out portion is formed between abutted end portions of the flange, and a crossover wire of a winding is pulled out from the winding draw-out portion to outside the core member, whereby it is possible to positively perform routing treatment from the winding portion of the winding to the crossover wire and it is ensured that the crossover wire can be positively fixed without bringing a crossover wire of a different phase into contact.

9 Claims, 9 Drawing Sheets

AXIAL AIR-GAP ELECTRONIC MOTOR

TECHNICAL FIELD

The present invention relates to an axial air-gap electronic motor in which a stator and a rotor are arranged in an opposed manner, with a prescribed air gap provided along an axis direction of a rotor output shaft of the rotor and, more particularly, to an axial air-gap electronic motor that permits safe and easy routing with good workability without bringing crossover wires for each phase into contact with each other.

BACKGROUND ART

For example, as disclosed in Japanese Patent Application Publication No. 2004-282989, the axial air-gap electronic motor is a motor in which on one of two side surfaces or both side surfaces of a stator is disposed a rotor with a prescribed air gap in an opposed manner, and the axial air-gap electronic motor is characterized by the fact that compared to a radial gap motor, such as the inner rotor type, it is possible to reduce the thickness in the rotating shaft direction, that is, it is possible to make the shape of the motor flat.

Incidentally, in the axial air-gap electronic motor described in Japanese Patent Publication No. 2004-282989, the stator is formed by annularly connecting a plurality of fan-shaped core members.

With this axial air-gap electronic motor, the stator can be easily formed simply by winding beforehand a winding to each of the core members, annularly connecting each of the core members, and mutually connecting the windings drawn out from each of the core members.

In this case, in order to mutually connect the windings drawn out from each of the core members for each phase (for example, the U-phase, V-phase, W-phase), each of the core members is provided with a crossover wire supporting portion for laying a crossover wire individually for each phase.

However, although the axial air-gap electronic motor described in Japanese Patent Publication No. 2004-282989 is provided with a crossover wire supporting portion for supporting a crossover wire for each phase, in each core member there is particularly no means of guiding a winding between a bobbin around which a coil is wounded and the above-described crossover wire supporting portion. Therefore, it is difficult to route windings between the two and windings of different phases may sometimes come into contact with each other.

In conventional methods, in connecting the neutral points of phases, the windings are connected by soldering on the lateral side of the above-described crossover wire supporting portion. However, the connection portion becomes thick because a plurality of windings are bundled together in this portion, with the result that windings of different phases become apt to come into contact with each other.

Furthermore, after the winding of each core member is connected, eventually the stator becomes integrally stiffened within a molding die with a synthetic resin. On that occasion, at some injection pressures and injection speeds of the resin, the winding portion may sometimes shift, thereby causing poor contact and the like.

SUMMARY OF THE INVENTION

In order to solve the above-described problems, the object of the present invention is to provide an axial air-gap electronic motor that ensures that the routing treatment in an area from a winding portion of a winding to a crossover wire can be positively performed and that a crossover wire can be positively fixed without causing a crossover wire of a different phase to come into contact with the crossover wire.

To solve the above-described problems, the present invention provides an axial air-gap electronic motor in which a stator and a rotor are arranged in an opposed manner with a prescribed air gap provided along an axis direction of a rotor output shaft of the rotor, the stator has a plurality of core members arranged annularly around an axis of the rotor output shaft and the core members are mutually connected via prescribed connection means. In this axial air-gap electronic motor, each of the core members is formed in the shape of a bobbin that has a stator core and an insulator insulating a winding portion of the stator core, the insulator has a pair of flanged portions parallel to a teeth face of the stator core, and at least one of the flanged portions is provided with a winding draw-out portion for drawing out part of the winding to outside the core member.

According to this axial air-gap electronic motor, the winding wound around the core member can be easily drawn out from the winding draw-out portion to outside and the crossover wire can be smoothly treated as it is.

The present invention includes some preferred aspects. According to a first preferred aspect of the present invention, the winding draw-out portion comprises a notched portion formed in one of two circumferential end portions of each of the flange portions or both of the circumferential end portions and in connecting the adjacent core members to each other, the winding draw-out portion is formed between abutted end portions of each of the flanged portions.

According to this first preferred aspect, the winding draw-out work can be easily performed and besides, the fixing of the winding draw-out portion can be positively performed.

According to a second preferred aspect, a hook portion is provided in a protruding manner on one circumferential end portion of each of the flanged portions, a cylindrical locking shaft to which the hook portion of the adjacent core member is locked is provided in a protruding manner on the other circumferential end portion side of each of the flanges, and the notched portion is provided in a base portion of the hook portion and/or the latching shaft.

According to this second preferred aspect, it is possible to perform the form fixing of the winding draw-out portion at the same time with the fixing of each of the core members.

According to a third preferred aspect, the winding draw-out portion further contains a notched portion formed inward from a radial peripheral edge portion of each of the flanged portions. According to this third preferred aspect, the other end portion of the winding can be drawn out via the notched portion and besides, the winding can be fixed by being hooked on the notched portion.

According to a fourth preferred aspect, a crossover wire treatment portion for treating a crossover wire of the winding for each phase is provided on an external side surface of one of the flanged portions, and a neutral connection portion for connecting a crossover wire of a different phase of the winding is provided on an external side surface of the other flanged portion.

According to this fourth preferred aspect, it is possible to perform the treatment for connecting the crossover wire and the treatment for connecting the neutral point separately on the two sides of the flange portion.

According to a fifth preferred aspect, the neutral connection portion has a metal clip that sandwiches the crossover wire in an electrically conducting state, and a holding portion that holds the metal clip is provided on the external side surface of the other flanged portion. According to this fifth preferred aspect, the crossover wire for the connection of the neural point can be easily and positively connected.

According to a sixth preferred aspect, the crossover wire treatment portion has a supporting groove that supports the crossover wire for each phase, and the supporting groove is provided with an introduction portion for guiding the crossover wire into the supporting groove.

According to this sixth preferred aspect, the winding drawn out from the winding draw-out portion can be smoothly drawn into the support groove without interference with other windings.

According to a seventh preferred aspect, the crossover wire treatment portion serves also as a terminal block of a terminal strip to which each of the crossover wires is connected. According to this seventh preferred aspect, it is unnecessary to separately provide a terminal block and, therefore, it is possible to reduce fabrication costs.

According to an eighth preferred aspect, on the external side surface of the flanged portion is provided a pair of guide ribs in a radially different positions, and an air gap formed between the guide ribs is spanned with the crossover wire.

According to this eighth preferred aspect, the crossover wire can be positively laid and besides, in integrally molding each of the core members with a resin, it is possible to prevent the winding from moving.

According to a ninth preferred aspect, the winding draw-out portion is disposed radially inward from the supporting groove. According to this ninth preferred aspect, the winding drawn out from the winding draw-out portion and the crossover wire laid in the supporting groove do not come into contact with each other and, therefore, the routing of the winding can be more easily performed.

DETAILED DESCRIPTION

Figure 1:
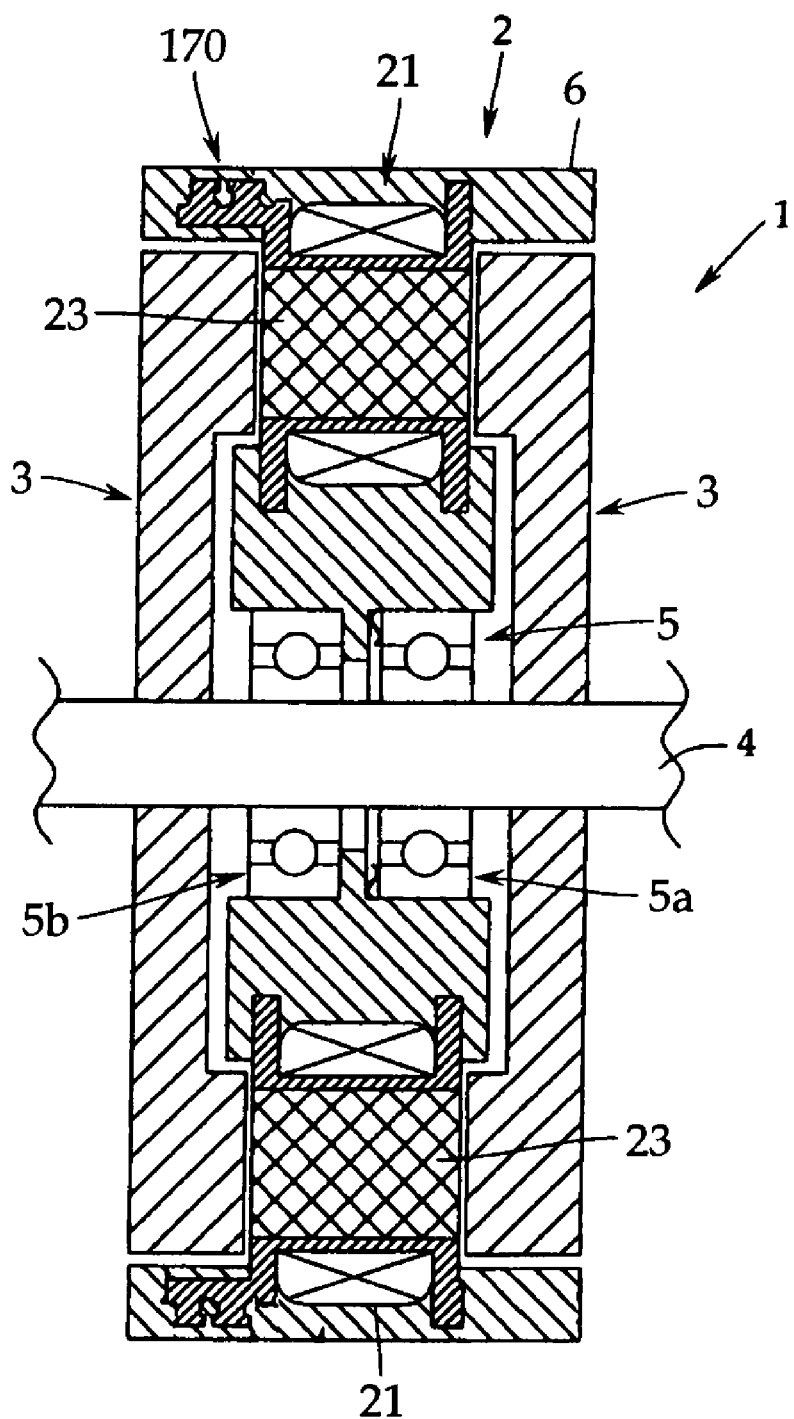
FIG. 1 is a sectional view showing an essential part of an axial air-gap electronic motor related to an embodiment of the present invention.

As shown in FIG. 1, an axial air-gap electronic motor 1 related to this embodiment is provided, as a basic configuration, with a stator 2 formed in the shape of a disc and a pair of rotors 3 with a prescribed air gap on both sides of the stator 2 in an opposed manner. Each of the rotors 3 is coaxially fixed to a rotor output shaft 4 that outputs a rotational driving force.

A bearing portion 5 is disposed in the central part of the stator 2. In this embodiment, the bearing portion 5 has a pair of radial bearings 5a, 5b, an inner ring of which is press fitted into the rotor output shaft 4 and the outer ring side of which is buried in a synthetic resin material 6 that stiffens the stator 2. In the present invention, the construction of the bearing portion 5 may be optional.

The stator 2 and each of the rotors 3 are housed in an unillustrated bracket. In this embodiment, a peripheral surface of the stator 2 serves also as a peripheral wall of the bracket and a cover member of the bracket is attached to both ends of the stator. Incidentally, each of the rotors 3 may be attached directly to a fan and the like instead of using the cover member.

In this embodiment, the rotor 3 as a pair is disposed on both right and left sides of the stator 2, but may be disposed on only one of the right and left sides. In this embodiment, it is necessary only that the rotor 3 have functions necessary for making up the axial air-gap electronic motor 1, and the construction of the rotor 3 can be optionally changed according to specifications.

Although each of the rotors 3 shares the same rotor output shaft 4, it is also possible to adopt a two-output shaft type in which a rotor output shaft is provided for each of the rotors 3. Furthermore, it is also possible to adopt a shaftless type in which no rotor output shaft 4 is provided and each of the rotors 3 is supported directly via a radial ball bearing with respect to the stator 2.

Figure 2:
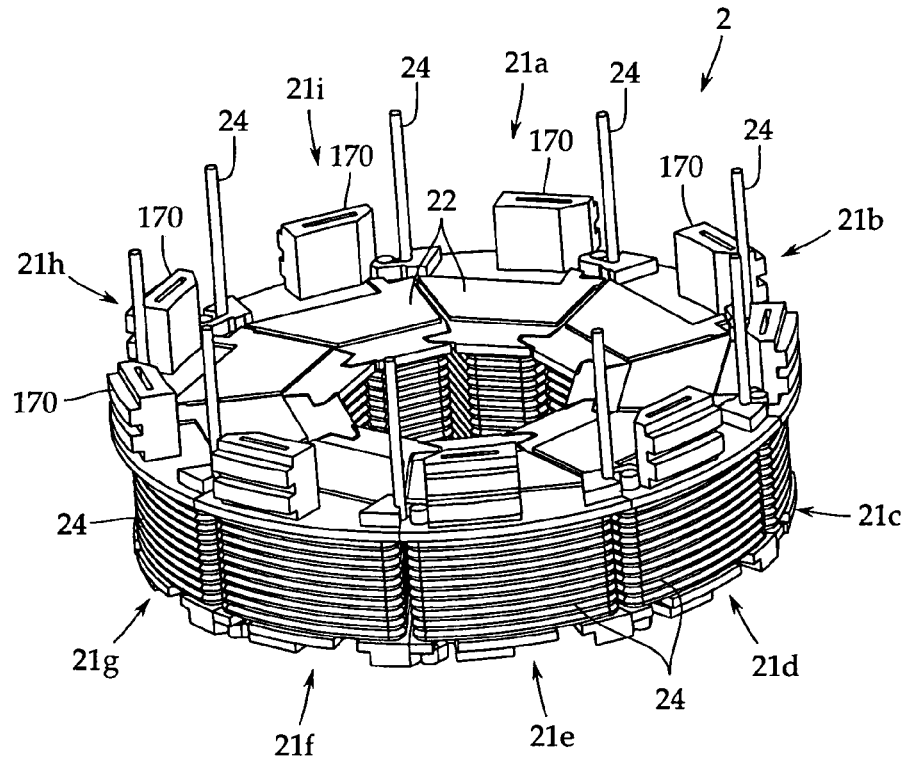
FIG. 2 is a perspective view showing a stator included in the above-described motor.

As shown in FIG. 2, this stator 2 includes a plurality of core members 21a to 21i (in this example, 9 core members (9 slots)), which are annularly arranged around the rotational axis of the rotor output shaft 4 as the central axis. Because each of the core members 21a to 21i has the same construction, in this embodiment, a description will be given of the core member 21a taken as an example.

Incidentally, in this embodiment, the expressions "an axial direction (only "axial" or "axially")," "a circumferential direction (only "circumferential" or "circumferentially")," "a radial direction (only "radial" or "radially")," "an outer circumferential side," and "an inner circumferential side" are based on the outer output shaft 4 as a reference.

With reference to FIG. 3 and FIGS. 4A to 4F, the core member 21a has a stator core 23 around which a winding 24 (see FIG. 2) is wound. The stator core 23 is formed in the shape of a bobbin having a pair of right and left flanged teeth faces 22, 22 by laminating a plurality of substantially H-shaped electrical steel sheets along a radial direction.

In this embodiment, on both circumferential ends of the teeth face 22 is formed a skew inclined at a prescribed angle in order to reduce a cogging torque. However, the shape of the teeth face 22 including the existence or nonexistence of a skew may be optionally selected according to specifications.

The stator core 23 is exposed only on the teeth faces 22, 22, and other parts of the stator core 23 are covered with an insulator 100 formed from an insulating resin.

The insulator 100 has a pair of right and left flanged portions 110a, 110b formed along the teeth faces 22, 22, and also the flanged portions 110a, 110b form part of the bobbin around which the winding 24 is wound.

Incidentally, when it is unnecessary to make a distinction between one flanged portion 110a and the other flanged portion 110b, the flanged portion 110 is referred to for the sake of a concise explanation.

Each of the flanged portions 110 is provided with connection means for annularly connecting the core members 21a to 21i around the axis of the rotor output shaft 4 as the center. As the connection means are used a hook portion 120 provided on one end-portion side of the flanged portion 110 in the circumferential direction thereof and a locking shaft 130 provided on the other end-portion side, which serves as a mating part of the flanged portion 110.

Figure 5:
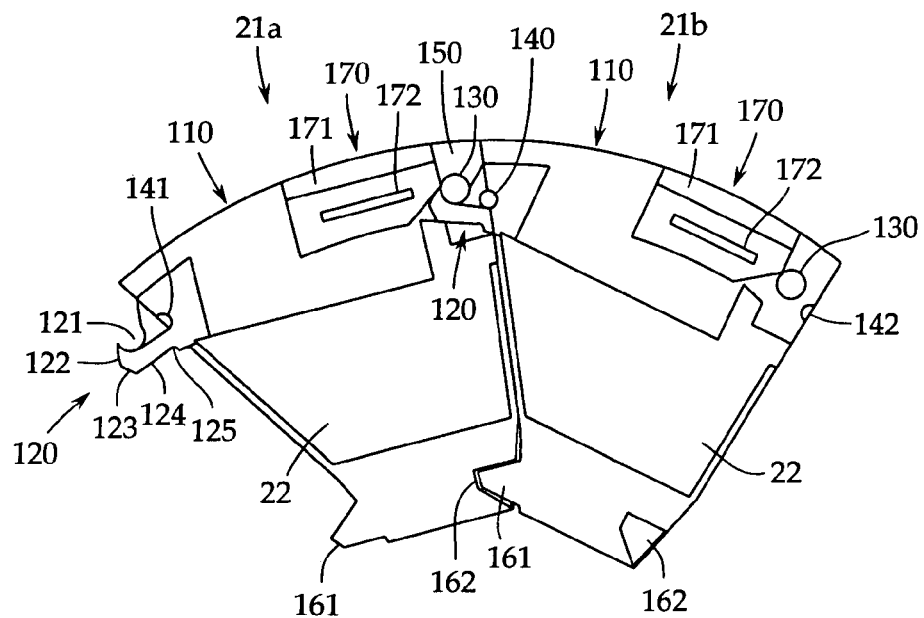
FIG. 5 is a front view showing how the above-described core member is connected.

With reference to FIG. 5 in addition to FIG. 3 and FIGS. 4A to 4F, on the outer circumferential side of the flanged portion 110, the hook portion 120 is provided in a protruding manner outward from one end portion (the left end in FIG. 5) in the circumferential direction of the flanged portion 110, and on the top surface of the hook portion 120 is provided a hook groove 121 that is locked to the locking shaft 130.

The hook groove 121 comprises a circular arc groove that is locked to the peripheral surface of the locking shaft 130, and by locking the hook groove 121 to the locking shaft 130 of an adjacent core member, each of the core members 21a to 21i is connected so as to be rotatable around the locking shaft 130.

The hook portion 120 is provided with a first guide surface 122, a second guide surface 123 and a third guide surface 124 for smoothly locking the hook portion 120 to the locking shaft 130. The first guide surface 122 comprises a tapered surface formed diagonally downward left from an end edge of the hook groove 121 toward a leading end thereof (see FIG. 5).

The second guide surface 123 comprises a tapered surface formed diagonally downward right from a leading end of the first guide surface 122 toward the flanged portion 110 side (see FIG. 5).

The third guide surface 124 comprises a tapered surface formed diagonally upward right from an end portion of the second guide surface 123 toward a base end of the flanged portion 110 (see FIG. 5).

In the base portion of the third guide surface 124 and of the flanged portion 110 is provided a curved concavity that abuts along the guide portion 150 in connecting the remaining two core members after the connection of the core members 21a to 21i.

At the other end side of each of the flanged portions 110 (at an end portion opposite to the hook portion 120), the locking shaft 130 is provided to as to protrude outward in columnar form. In this case, the locking shaft 130 on the flanged portion 110a side and the locking shaft 130 on the flanged portion 110b side are coaxially arranged.

In this embodiment, the hook portion 120 and the locking shaft 130 are provided respectively in the flanged portions 110a and 110b but may also be provided in at least one flanged portion 110.

Each of the flanged portions 110 is provided, on an inner circumferential side thereof, with a locking convexity 161 as connection guide means for annularly connecting the core members 21a to 21i more positively, and with a locking concavity 162 as the receiving side of the locking convexity 161.

As shown in FIG. 5, the locking convexity 161 comprises a convexity provided so as to protrude outward from one end portion (the left end in FIG. 5) of the flanged portion 110 in the circumferential direction thereof. In this embodiment, the locking convexity 161 is a tongue formed in triangular form.

In contrast to this, the locking concavity 162 comprises a notched groove formed inward from the other end portion (the right end in FIG. 5) of the flanged portion 110 in the circumferential direction thereof. The locking concavity 162 is formed as a triangle-shaped groove so as to fit on the locking convexity 161 in terms of shape.

Next with reference to FIG. 4A to 4F, on both end portions of one flanged portion 110a (the flanged portion on the front side of the paper in FIG. 4A) in the circumferential direction thereof, there is provided a pair of notched portions 141, 142 for forming a winding draw-out portion 140 for drawing out a crossover wire 24a of the winding 24 from between the abutted end portions of adjacent core members 21a to 21i when the adjacent core members 21a to 21i are connected.

With reference to FIG. 5 in addition to FIG. 4A to 4F, the notched portion 141 is formed on the side of one of the two end portions of the flanged portion 110a where the hook portion 120 is provided. It is preferred that the notched portion 141, which is notched in semicircular form, be formed in the base portion of the hook portion 120.

In contrast to this, the other notched portion 142 is formed on the end portion side of the flanged portion 110a on the side where the locking shaft 130 is provided. Each of the notched portions 141, 142 is provided on the same circumference of the flanged portion 110a.

According to this construction, as shown in FIG. 5, in connecting the adjacent core members 21a to 21i, the notched portions 141, 142 provided on the abutted surfaces are opposed to each other and the circular draw-out portion 140 is formed.

Because the notched portion 141 is provided in the base portion of the hook portion 120, the hook groove 121 of the hook portion 120 performs the role of a guide for the winding 24 and can easily guide the crossover wire 24a of the winding 24 into the notched portion 141.

Figure 6:
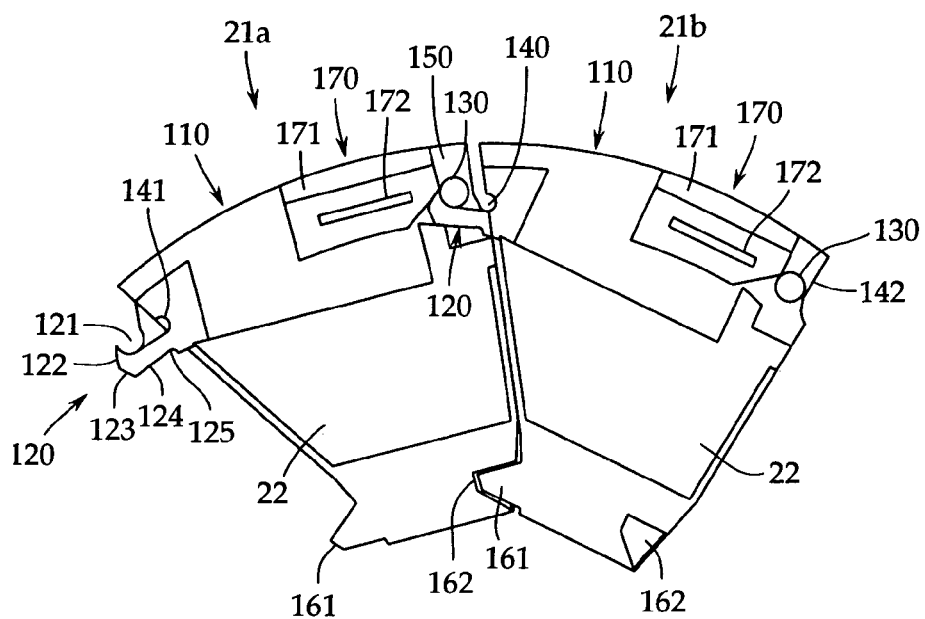
FIG. 6 is a front view showing a modification of a winding draw-out portion.

In this embodiment, the circular winding draw-out portion 140 is formed by aligning the notched portions 141, 142, which are respectively formed in semicircular form, with each other. In addition to this, however, as shown in FIG. 6, the winding draw-out portion 140 may also be formed in groove form by notching part of one notched portion 142 in the radial direction.

Figure 7A:
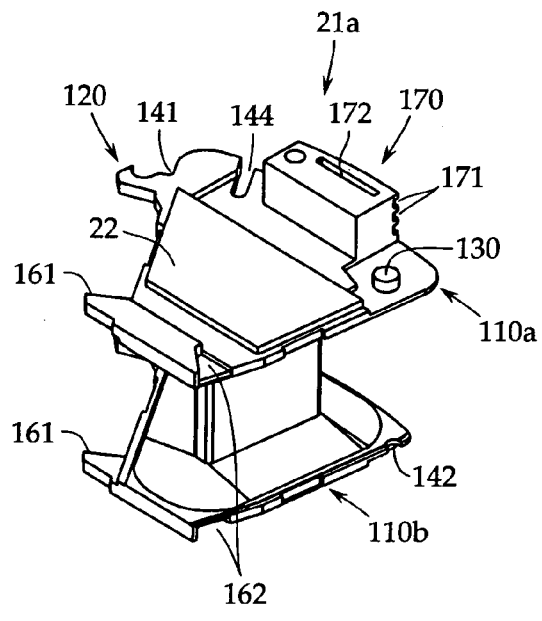
FIG. 7A is a perspective view showing another example of a winding draw-out portion.
Figure 7B:
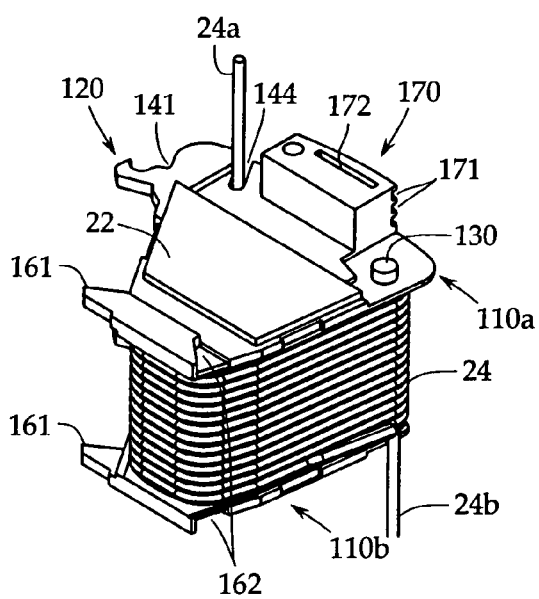
FIG. 7B is a perspective view showing the condition of a winding drawn out from the winding draw-out portion of FIG. 7A.

Also, in place of these notched portions 141, 142, as shown in FIGS. 7A and 7B, a notched groove 144 may be formed inward from the outside of the radial direction of the flanged portion 110a so that the crossover wire 24a of the winding 24 can be drawn out from this notched groove 144.

It is preferred that the winding draw-out portion 140 (including the notched groove 144) be disposed radially inward (on the rotating shaft side) from a supporting groove 171 of a crossover wire treatment portion 170, which will be described later.

That is, by disposing the winding draw-out portion 140 inward from the supporting groove 171, it is ensured that the crossover wire 24a drawn out from the winding draw-out portion 140 and the crossover wire 24a supported by the supporting groove 171 do not come into contact with each other. Therefore, it is possible to more easily perform the routing of the crossover wire 24a.

One flanged portion 110a is provided with the crossover wire treatment portion 170 for routing the crossover wire 24a drawn out from the core member for each of the U-phase, V-phase and W-phase.

Figure 3:
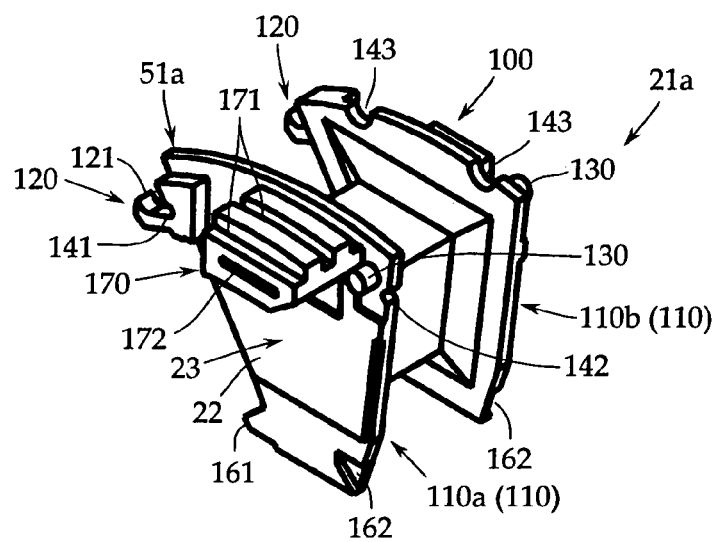
FIG. 3 is a perspective view showing a core member, which is a component element of the above-described stator.
Figure 4A:
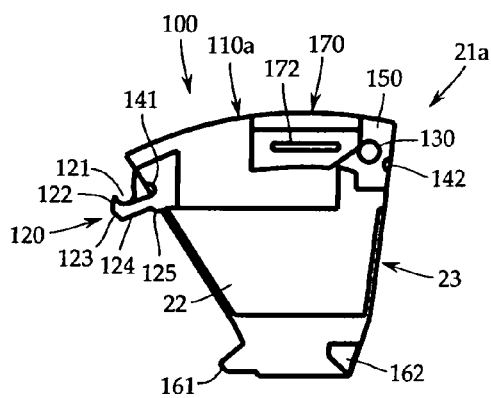
FIG. 4A is a front view of the above-described core member.
Figure 4B:
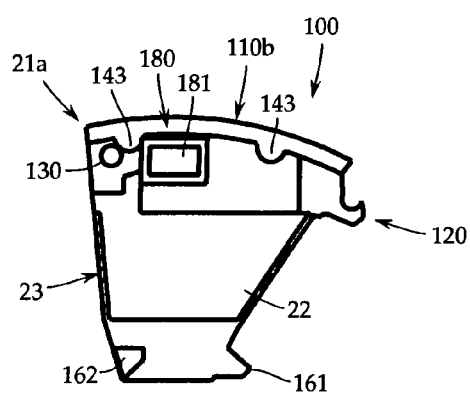
FIG. 4B is a rear view of the above-described core member.
Figure 4C:
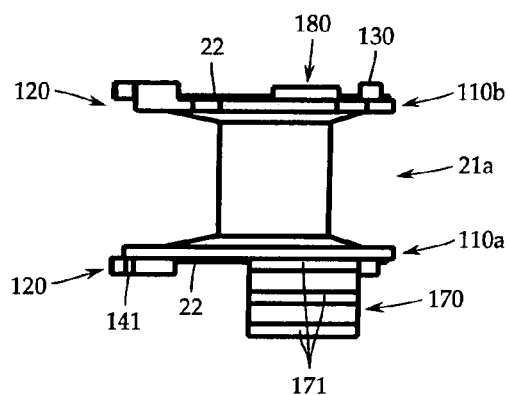
FIG. 4C is a plan view of the above-described core member.
Figure 4D:
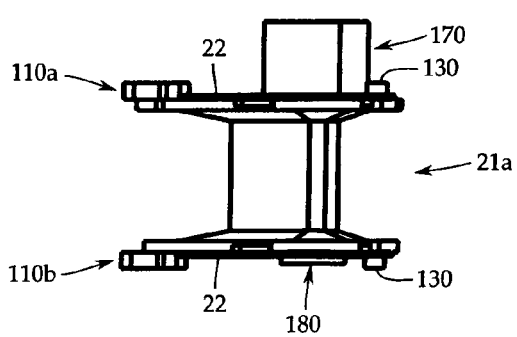
FIG. 4D is a bottom view of the above-described core member.
Figure 4E:
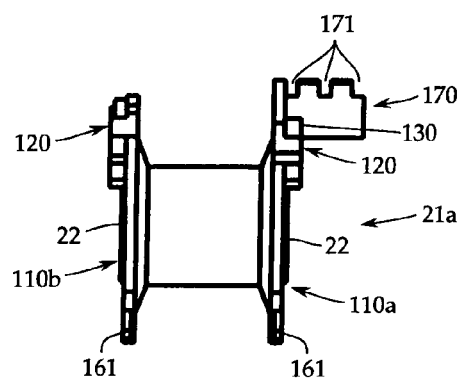
FIG. 4E is a left side view of the above-described core member.
Figure 4F:
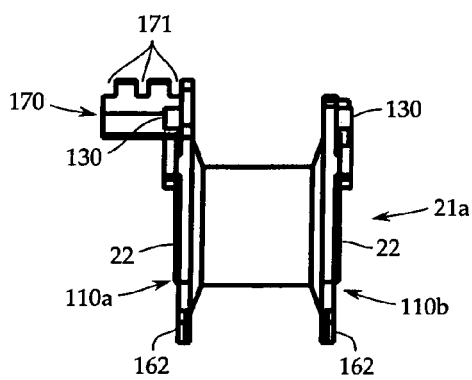
FIG. 4F is a right side view of the above-described core member.

As shown in FIG. 3, the crossover wire treatment portion 170 is integrally provided in a protruding manner outside the flanged portion 110a, and on a top surface of the crossover wire treatment portion 170 are formed, for example, three supporting grooves 171 at prescribed intervals and parallel to each other. Incidentally, in this embodiment, the supporting grooves 171 present on the outer side are formed in stage form.

Figure 10:
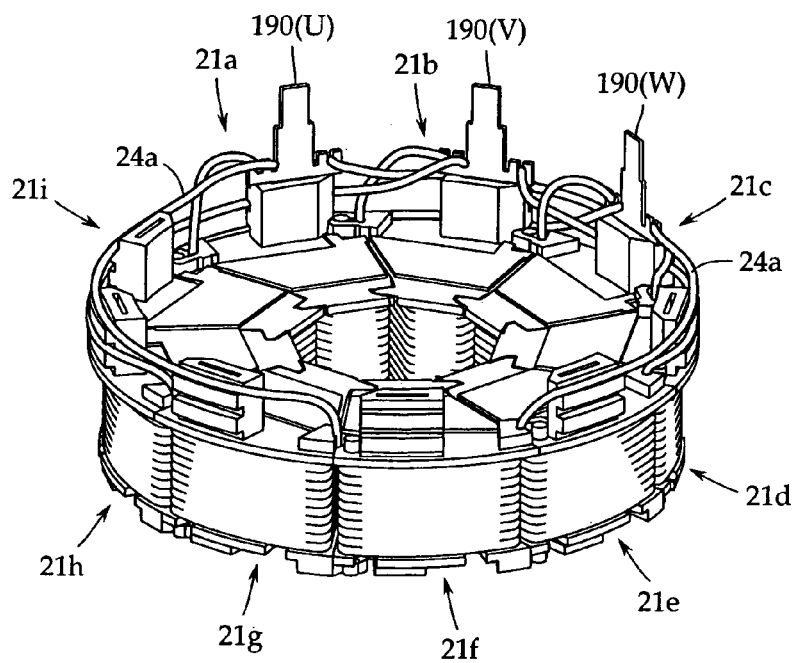
FIG. 10 is a perspective view showing the condition of crossover wires installed in a stator.

The supporting groove 171 is formed along the circumferential direction of the crossover wire treatment portion 170, and as shown in FIG. 10, the crossover wire 24a for each phase is laid along the supporting groove 171.

A slit-like terminal board holding groove 172 is formed on an axial end surface of the crossover wire treatment portion 170. Because a terminal board 190 is held by this terminal board holding groove 172 by being inserted therein as shown in FIG. 10, the crossover wire treatment portion 170 serves also as a terminal block of the terminal board 190. As will be described later, crossover wires 24a of the same phase are electrically connected to each other at this terminal board 190.

In the other flanged portion 110b (the flanged portion on the front side of the paper in FIG. 4B) is formed a notched portion 143 for drawing out a crossover wire 24b for neutral connection (see FIG. 11) from the winding 24. The notched portion 143 comprises a groove notched, for example, in semicircular form inward from the peripheral surface of the flanged portion 110b. Also this notched portion 143 is included in the winding draw-out portion 140.

Figure 8:
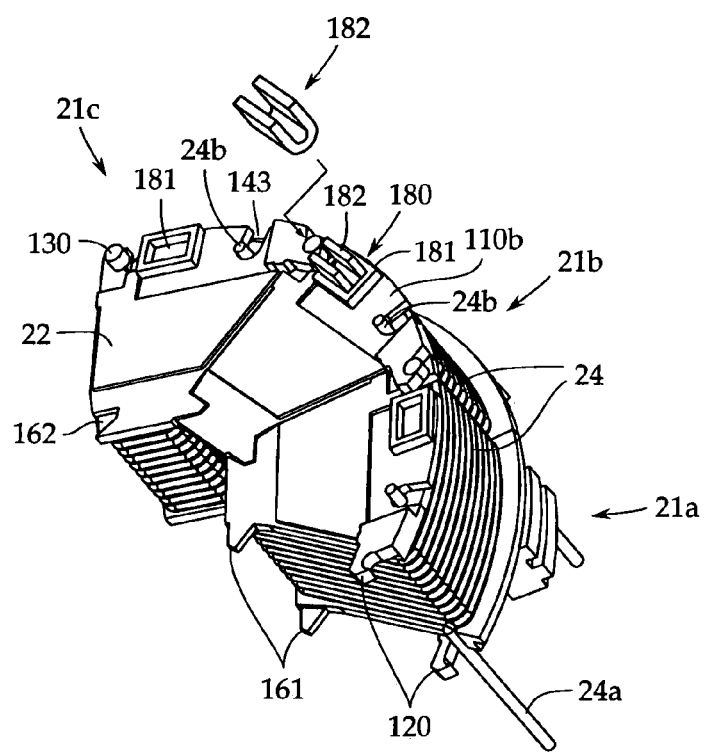
FIG. 8 is an exploded perspective view showing a neutral connection portion.
Figure 11:
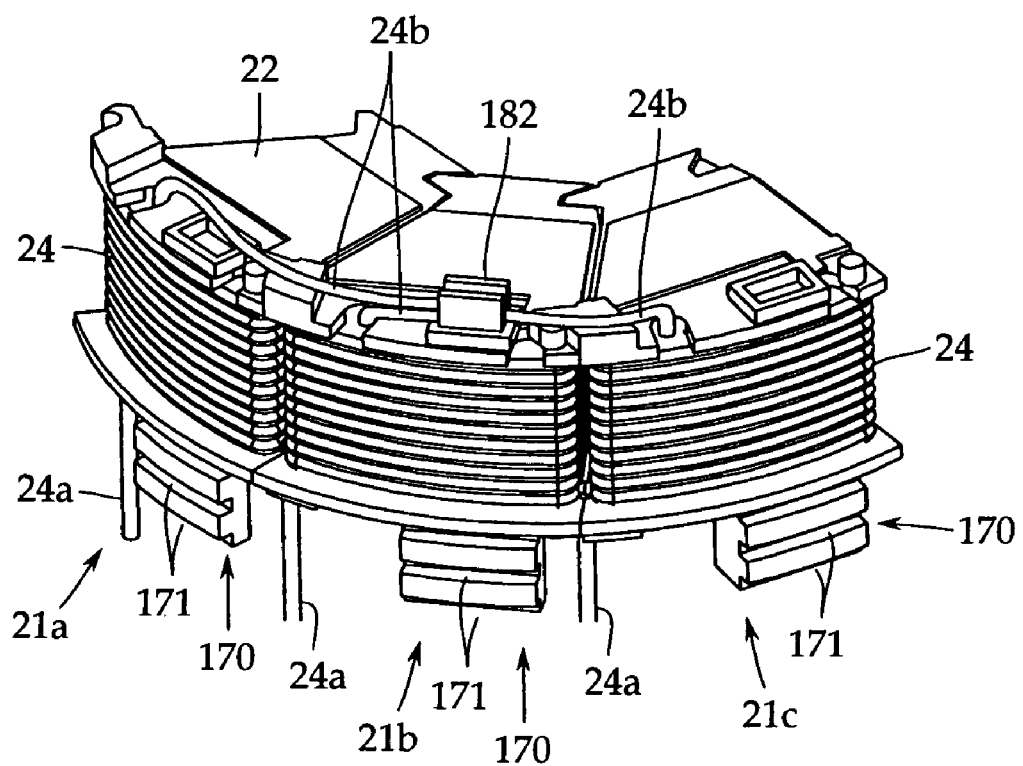
FIG. 11 is a perspective view showing the condition of crossover wires for neutral connection installed in a stator.

As shown in FIGS. 8 and 11, the other flanged portion 110b is provided with a neutral connection portion 180 for electrically connecting the crossover wires 24b for the neutral connection of each phase to each other. The neutral connection portion 180 is provided with a clip holding portion 181 formed on an external surface of the flanged portion 110b and a metal clip 182 locked to the clip holding portion 181.

In this embodiment, the clip holding portion 181 is formed as a quadrangular frame provided in a protruding manner on the external surface of the flanged portion 110b. The metal clip 182 comprises a metal plate that is folded in the shape of the letter U, preferably a plate spring having elasticity.

According to this construction, the crossover wire 24b of each phase is inserted into the metal clip 182 and both ends of the metal clip 182 are joined by soldering, welding and the like, whereby the crossover wire 24b can be easily connected. Furthermore, the connection portion can be readily fixed simply by inserting the metal clip 182 into the clip holding portion 181. Incidentally, the metal clip 182 may be integrally attached beforehand within the clip holding portion 181.

In assembling the stator 2, first, the winding 24 is wound around each of the core members 21a to 21i.

Figure 14:
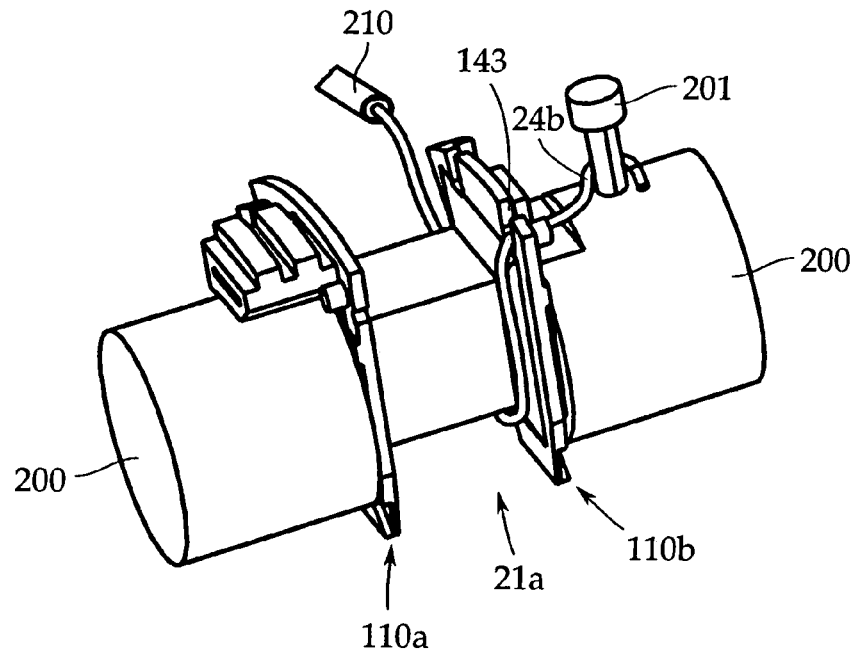
FIG. 14 is a perspective view to explain a procedure for winding windings around core members.

How to assembly the stator 2 will be described with reference to FIG. 14. The core member 21a is mounted between a pair of jigs 200, 200 connected to unillustrated rotational driving means such as a motor.

Next, the winding 24 drawn out from a needle 210 is caused to run along a bobbin (winding portion) of the core member 21a, hooked on the notched portion 143 of the flanged portion 110b, and a leading end of the winding 24 is wound around a locking portion 201 of the jig 200 and locked. This portion becomes the crossover wire 24b for neutral connection.

The jigs 200, 200 are rotated via the above-described rotational driving means and the winding 24 is wound required turns around the core member 21a. After that, with a prescribed length of the crossover wire 24a ensured, the winding 24 is cut off from the needle 210. The winding 24 is similarly wound around the core members 21b to 21i.

Figure 9A:
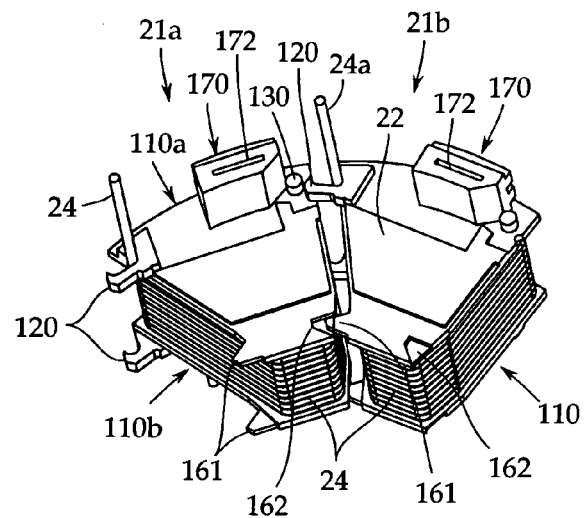
FIGS. 9A and 9B are perspective views to explain a procedure for connecting the above-described core member.
Figure 9B:
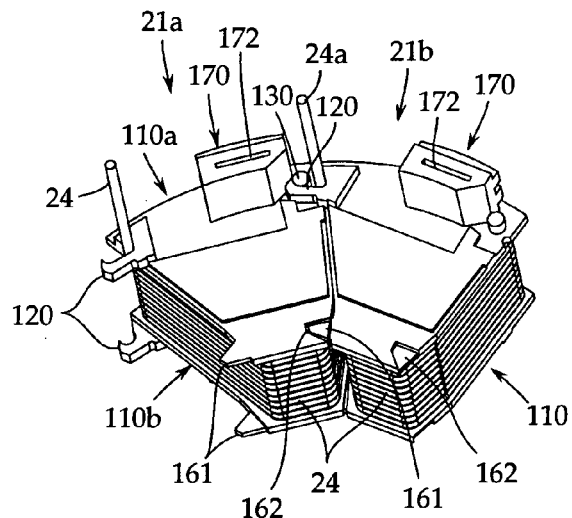

Next, as shown in FIG. 9A, the hook portion 120 of the core member 21b is hooked on the locking shaft 130 of the adjacent core member 21a. And as shown in FIG. 9B, for example, the core member 21b is rotated to the core member 21a side around the locking shaft 130, whereby the locking convexity 161 of the core member 21b is fitted into the locking concavity 162 of the core member 21a.

At this time, part of the winding 24 (which becomes the crossover wire 24a) is hooked on the notched portion 141 of the hook portion 120, whereby as a result of a connection between the core member 21a and the core member 21b, the crossover wire 24a is drawn out from between the notched portions 141, 142 and the drawn-out end of the crossover wire 24a becomes fixed.

After the core members 21a to 21i are sequentially connected in this manner, the end portion of the core member 21a and the end portion of the core member 21i are finally connected to form an annulus.

In this case, the leading end portion of the hook portion 120 of the core member 21a is caused to abut against the locking shaft 130 of the core member 21i and in this state the hook portion 120 is pressed into the locking shaft 130 side.

As a result of this, the hook portion 120 is deformed downward by the first guide surface 122 and the locking shaft 130 hooks the hook groove 121. The locking convexity 161 of the core member 21a becomes fitted into the locking concavity 162 of the core member 211.

After the core members 21a to 21i are annularly connected in this manner, the crossover wire 24a drawn out from the winding draw-out portion 140 of each of the core members 21a to 21i is laid along the crossover wire treatment portion 170 of the flanged portion 110a. The crossover wire 24a is laid for each of the U-phase, V-phase and W-phase along the supporting groove 171 of the crossover wire treatment portion 170.

With reference to FIG. 10, in treating the crossover wire 24a, the terminal board 190 is inserted into the terminal board holding groove 172 of the winding treatment portion 170 of, for example, the core members 21a, 21b, 21c.

Figure 15:
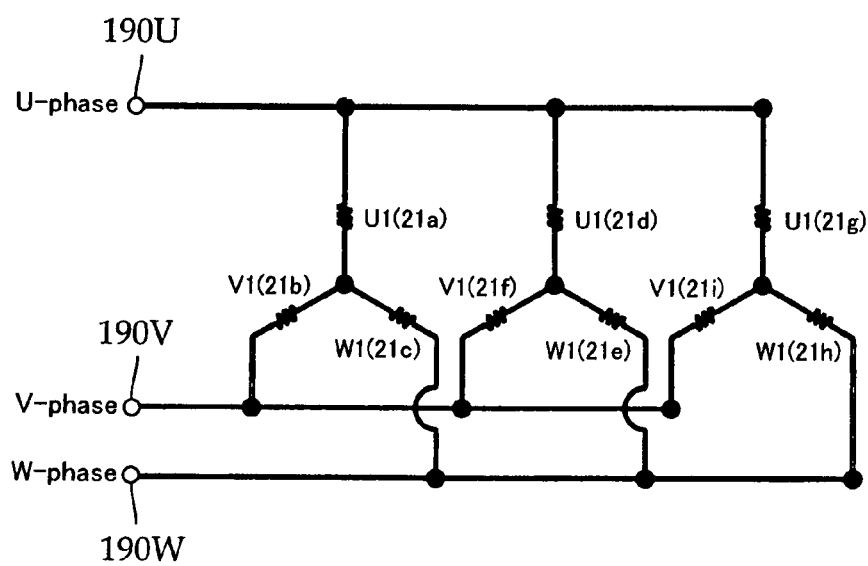
FIG. 15 is a circuit diagram showing connections of windings of core members.

In this embodiment, as shown in FIG. 15, the U-phase contains the core members 21a, 21d, 21g, the V-phase contains the core members 21b, 21f, 21i, and the W-phase contains the core members 21c, 21e, 21h.

Therefore, for example, a U-phase terminal board 190U is attached to the core member 21a, a V-phase terminal board 190V is attached to the core member 21b, and a W-phase terminal board 190W is attached to the core member 21c.

As shown in FIG. 10, the crossover wire 24a drawn out from the core member 21d, which belongs to the U-phase core members 21a, 21d, 21g, passes through the supporting groove 171 formed in the middle of the crossover wire treatment portion 170, is laid anticlockwise to the core member 21a, and then connected to the terminal board 190U.

Inversely, the crossover wire 24a drawn out from the core member 21g passes through the supporting groove 171 formed outside the crossover wire treatment portion 170, is laid clockwise to the core member 21a, and then connected to the terminal board 190U. Incidentally, the crossover wire 24a of the core member 21a is connected to the terminal board 190U as it is.

Similarly, each crossover wire 24a of the V-phase and W-phase is also laid along the crossover wire treatment portion 170 so that crossover wires of different phase do not come into contact with each other, and is then connected to each of the corresponding terminal boards 190V, 190W.

In this embodiment, the core members 21a to 21i are connected in parallel in order: U-phase (21a)→V-phase (21b)→W-phase (21c)→U-phase (21d)→V-phase (21e)→W-phase (21f)→U-phase (21g)→V-phase (21h)→W-phase (21i). However, the present invention can also be applied to a case where the core members 21a to 21i are connected in series parallel in order: U-phase (21a)→U-phase (21b)→U-phase (21c)→V-phase (21d)→V-phase (21e)→V-phase (21f)→W-phase (21g)→W-phase (21h)→W-phase (21i).

Next, a connection method of neutral points will be described. In parallel connection, as shown in FIG. 15, neutral points are formed by connecting the different phases of adjacent U-phase, V-phase and W-phase to each other.

Therefore, the leading end of each of the crossover wires 24b drawn out from the notched portion 143 of the flanged portion 110b of the core members 21a, 21b, 21c is inserted into the metal clip 182 provided, for example, in the core member 21b, whereby a neutral point can be easily connected.

Similarly, also for the core members 21d, 21e, 21f and the core members 21g, 21h, 21i, the neutral points thereof can be easily connected.

Next, with reference to FIGS. 12A to 12F and FIG. 13, another embodiment for each insulator of the core members 21a to 21i will be described. Incidentally, in this additional embodiment, the core members 21a to 21b have the same construction as in the above-described embodiment and, therefore, descriptions of the core members 21a to 21b are omitted.

In this additional embodiment, crossover wire treatment portions 210, 220 are provided in each of the flanged portions 110a, 110b of the insulator 100.

The first crossover wire treatment portion 210 on the side of one flanged portion 110a (the flanged portion on the front side of the paper in FIG. 12A) is formed in a convex curved manner along the circumferential direction, and on the top surface thereof are formed a plurality of supporting grooves 211 (three supporting grooves in this case) in which the crossover wire 24a is laid at prescribed intervals and parallel to each other.

Figure 12A:
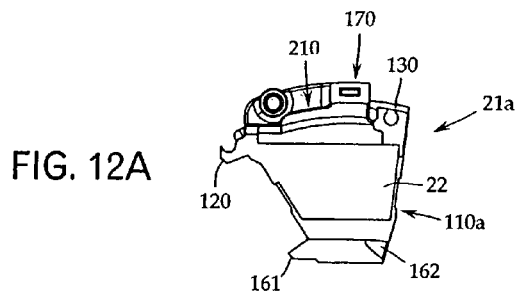
FIG. 12A is a front view of a core member related to a further embodiment of the present invention.
Figure 12B:
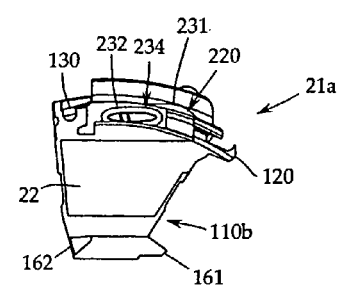
FIG. 12B is a rear view of the core member related to the above-described further embodiment.
Figure 12C:
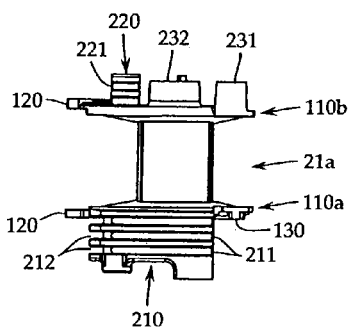
FIG. 12C is a plan view of the core member related to the above-described further embodiment.
Figure 12D:
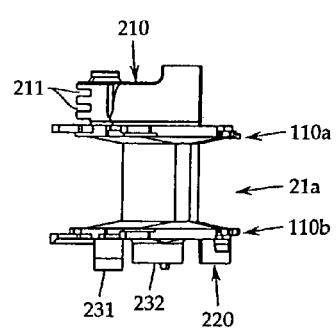
FIG. 12D is a bottom view of the core member related to the above-described further embodiment.
Figure 12E:
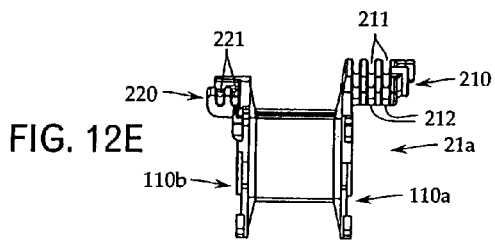
FIG. 12E is a left side view of the core member related to the above-described further embodiment.
Figure 12F:
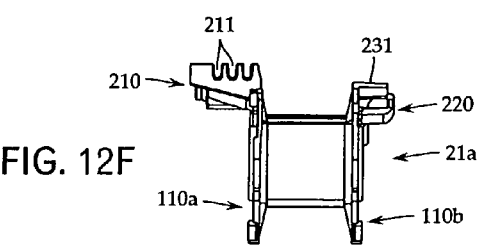
FIG. 12F is a right side view of the core member related to the above-described further embodiment.

As shown in FIGS. 12C and 12E, the first crossover wire treatment portion 210 is provided with an introduction portion 212 for guiding the crossover wire 24a into the supporting groove 211. The introduction portion 212 is formed as an extension on one end side of the supporting groove 211. The existence of this introduction portion 212 permits smooth wiring into the supporting groove 211 without bringing the crossover wire 24a drawn out from the core member into contact with the crossover wire 24 of a different phase.

The second crossover wire treatment portion 220 on the side of the other flanged portion 110b (the flanged portion on the front side of the paper in FIG. 12B) is intended for treating the crossover wire 24b for neutral connection, and on the top surface thereof are formed a plurality of supporting grooves 221 (two supporting grooves in this case) at prescribed intervals and parallel to each other.

Incidentally, as is apparent from FIG. 12C, the circumferential width of the second crossover wire treatment portion 220 is made smaller than that of the above-described first crossover wire treatment portion 210 and besides the second crossover wire treatment portion 220 is disposed nearer to the hook portion 120.

As shown in FIGS. 12B and 12C, a pair of guide ribs 231, 232 is further provided on the external surface of the flanged portion 110b in different radial and circumferential positions.

The first guide rib 231 is formed near the outer circumferential side of the flanged portion 110b in the circumferential direction thereof and provided in an extending manner from the circumferential end portion to the middle thereof.

The other second guide rib 232 is formed radially inward from the first guide rib 231 and formed nearer to the middle of in the circumferential direction.

Figure 13:
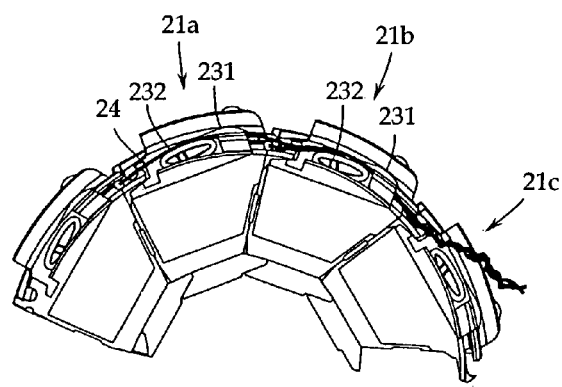
FIG. 13 is a perspective view showing the condition of crossover wires laid between guide ribs.

According to this construction, as shown in FIG. 13, by laying the crossover wire 24b for neutral connection within an air gap 234 formed between the guide ribs 231, 232, it is possible to prevent the movement of the crossover wire 24b in integrally molding the stator 2 with the synthetic resin 6 as shown in FIG. 1.

In each of the above-described embodiments, the axial air-gap electronic motor 1 is what is called a 9-slot 8-pole type in which the stator 2 has nine slots and each of the rotors 3, 3 has eight poles. However, the number of slots of the stator 2 and the number of poles of the rotor 3 may be optionally changed according to specifications.

The present application is based on, and claims priority from, Japanese Application Serial Number JP2006-302373, filed Nov. 8, 2006 the disclosure of which is hereby incorporated by reference herein in its entirety.

The invention claimed is:

1. An axial air-gap electronic motor comprising:
   a stator and a rotor arranged in an opposed manner with a prescribed air gap provided along an axis direction of a rotor output shaft of the rotor, and
   a plurality of core members arranged in the stator annularly around an axis of the rotor output shaft, the core members being mutually connected via prescribed connection means,
   wherein each of the core members is formed in a shape of a bobbin and has a stator core and an insulator insulating a winding portion of the stator core,
   the insulator has a pair of flanged portions parallel to a teeth face of the stator core, and at least one of the flanged portions is provided with a winding draw-out portion for drawing out part of the winding to outside the core member, and
   the winding draw-out portion comprises a notched portion formed in at least one of two circumferential end portions of the flanged portions, the notched portion being located between abutted end portions of the flanged portions in connecting adjacent core members to each other.

2. The axial air-gap electronic motor according to claim 1, wherein each of the flanged portions includes a hook portion protruding from one circumferential end portion thereof, and a cylindrical locking shaft to which the hook portion of the adjacent core member is locked, protruding from the other circumferential end portion of each of the flanges, and the notched portion is provided in a base portion of the hook portion and/or the locking shaft.

3. The axial air-gap electronic motor according to claim 1, wherein the winding draw-out portion further contains a notched portion formed inward from a radial peripheral edge portion of each of the flanged portions.

4. An axial air-gap electronic motor comprising:
   a stator and a rotor arranged in an opposed manner with a prescribed air gap provided along an axis direction of a rotor output shaft of the rotor, and
   a plurality of core members arranged in the stator annularly around an axis of the rotor output shaft, the core members being mutually connected via prescribed connection means,
   wherein each of the core members is formed in a shape of a bobbin and has a stator core and an insulator insulating a winding portion of the stator core,
   the insulator has a pair of flanged portions parallel to a teeth face of the stator core, and at least one of the flanged portions is provided with a winding draw-out portion for drawing out part of the winding to outside the core member,
   a crossover wire treatment portion for treating a crossover wire of the winding for each phase is provided on an external side surface of one of the flanged portions, and
   a neutral connection portion for connecting a crossover wire of a different phase of the winding is provided on an external side surface of the other flanged portion.

5. The axial air-gap electronic motor according to claim 4, wherein the neutral connection portion has a metal clip that sandwiches the crossover wire in an electrically conducting state, and a holding portion that holds the metal clip is provided on the external side surface of the other flanged portion.

6. The axial air-gap electronic motor according to claim 4, wherein the crossover wire treatment portion has a supporting groove that supports the crossover wire for each phase, and the supporting groove is provided with an introduction portion for guiding the crossover wire into the supporting groove.

7. The axial air-gap electronic motor according to claim 6, wherein the winding draw-out portion is disposed radially inward from the supporting groove.

8. The axial air-gap electronic motor according to claim 4, wherein the crossover wire treatment portion serves also as a terminal block of a terminal strip to which each of the crossover wires is connected.

9. The axial air-gap electronic motor according to claim 4, wherein on the external side surface of the flanged portion is provided a pair of guide ribs in a radially different positions, and an air gap formed between the guide ribs is spanned with the crossover wire.

* * * * *